Oct. 18, 1932.  H. L. WALTER  1,883,139
LIQUID MIXING APPARATUS
Filed March 8, 1930
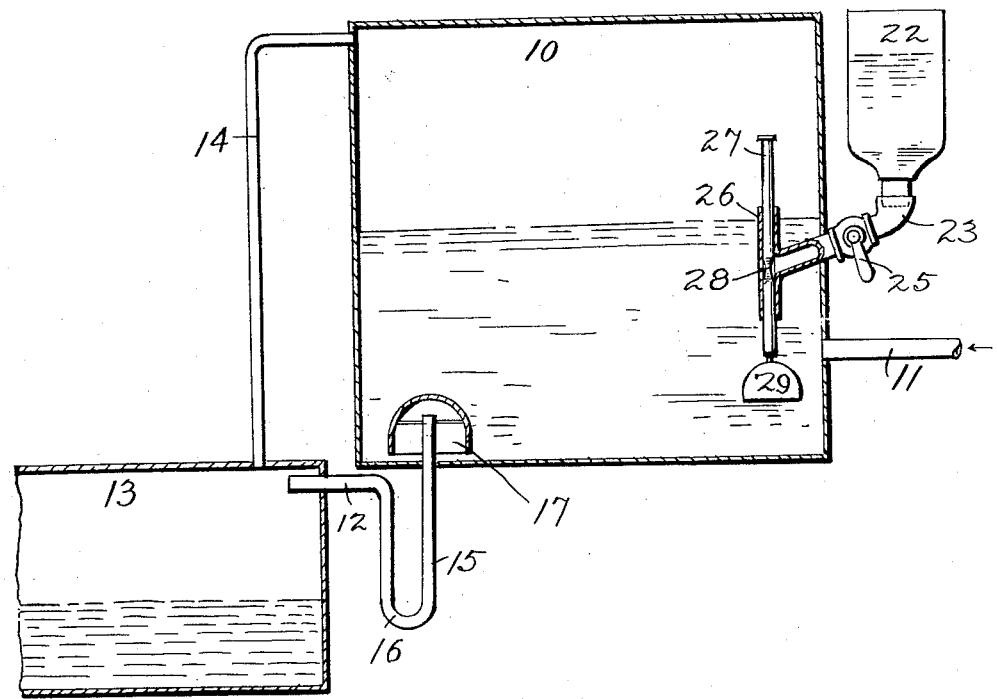
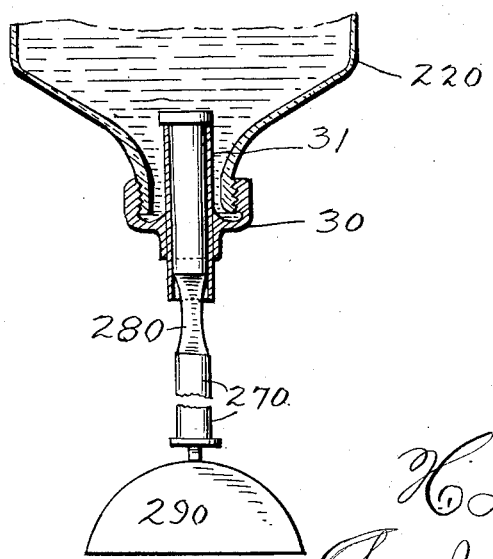
Inventor
H. L. Walter,
By Thos. J. Williamson
Attorney

Patented Oct. 18, 1932

1,883,139

UNITED STATES PATENT OFFICE

HENRY L. WALTER, OF TWIN FALLS, IDAHO

LIQUID MIXING APPARATUS

Application filed March 8, 1930. Serial No. 434,428.

In some localities, for example those sections of country where there are irrigation canals, water for domestic or household purposes, including water for drinking, is taken from the canals and run into cisterns from which the household supply is taken. Necessarily from farm land drainage, the canal water becomes dangerously contaminated. Life and health are, therefore, at stake. In making my invention, I have taken account of this condition and by my invention, I provide simple, efficient and automatically operating apparatus for charging or mixing with the water before or at the time it reaches the cistern a disinfecting or purifying medium which will render the water entirely sanitary or innocuous when used for drinking or taken into the human body. While primarily, my invention was produced to render domestic water supply sanitary by the automatic mixture therewith of a purifying agent in liquid form, it is to be understood that broadly considered, my invention includes the automatic quantitative mixing of liquids in a predetermined or desired proportion.

In particular, my invention is concerned with water supply systems using pressure means usually in the form of a tank from which water is forced by pressure to the places of use and an object of my invention is to effect the automatic quantitative mixing with the water on its way to the pressure tank, of a disinfecting or purifying medium.

My invention consists in whatever is described by or is included within the terms or scope of the appended claims.

In the drawing:—

Fig. 1 is a vertical section of apparatus embodying my invention which forms part of a domestic water supply for automatic mixing of water and a purifying chemical or reagent;

Fig. 2 is a vertical section illustrating a different arrangement of chemical supply devices;

Briefly described, the embodiment of my invention shown in the drawing comprises a mixing tank interposed in the pipe line from the source of water to the pressure tank, the mixing tank being closed except for the supply and discharge of water and the supply of chemical and except for an air connection between the two tanks to equalize the pressure in them, to enable the action of an automatic siphon for controlling the water flow from the mixing tank to the pressure or service tank.

Describing in detail what is shown in the drawing, the mixing tank, 10, closed to the outside with the exceptions before mentioned, has a water intake pipe, 11, connected with the canal or other source of supply and a siphon controlled outlet pipe, 12, which enters the pressure service tank, 13. A pipe, 14, extends from the air space in the upper part of the mixing tank, 10, to the space in the upper part of the pressure tank, 13, so that the interior of the two tanks is subject to the same pressure.

The siphon which controls the discharge may be of any suitable construction. It may for example be of the construction shown in my application No. 359,981 filed May 2, 1929 which includes a vertically swinging pipe. Or it may be a siphon of the construction shown in the drawing which involves and requires no moving parts and which includes the U-shape pipe, 15, with one leg extending through the bottom of the tank, 10, and reaching to a short distance above the bottom and the shorter leg, 16, which connects with the pipe, 12, that enters the pressure tank, 13. The open upper end of the pipe, 15, is within an inverted cap or bell, 17, whose bottom edge is spaced a short distance above the bottom of the mixing tank, 10, and which provides an air lock. The action of the siphon begins when the level of the water in the mixing tank, 10, provides an air column that equals the column reaching from the top of the discharge pipe, 12, and the bend that joins the two legs, 15 and 16, and water is siphoned out of the mixing tank, 10, until the bottom edge of the cup or bell, 17, is reached whereupon flow ceases and by the influx of water through the intake, 11, the mixing tank, 10, is filled to the level required again to start the action of the siphon.

It will be seen that by the automatic action of the siphon the filling and emptying of the tank, 10, will occur intermittently so that at intervals a substantially constant volume of water will enter and be emptied therefrom. With each such measured volume of water is automatically supplied a measured quantity of purifying agent which may be a chlorine solution.

The purifying or disinfecting agent, most conveniently in liquid form, is placed in a vessel or container, 22, which may have the form of an inverted bottle placed, if desired, outside the tank, 10, for convenient replenishing or replacement without loss of pressure in the system. Of course, it may be placed within the tank, 10.

When outside the tank as shown the mouth or nozzle of the container is inserted liquid tight in the upper end of a short pipe, 23, that passes through the adjacent side wall of the tank, 10, and within the latter communicates with an automatic dosage or measuring device.

To prevent loss of pressure when the container, 22, is being replaced, a cock or valve, 25, is applied to the pipe, 23.

The end of the pipe, 23, within the mixing tank, 10, communicates with a vertical tube or pipe, 26, between its ends in which is a vertically slidable valve in the form of a rod, 27, which ascends and descends with the change of level of water in the tank, 10, and by its vertical movement shifts a reduced portion, 28, into and out of alinement with the adjacent end of the tube, 23. When in alinement said reduced portion or recess receives the measured quantity of disinfectant and when the rod, 27, descends, it discharges or empties the contained quantity of disinfectant into the tank, 10. To the lower end of the rod, 27, is attached a float, 29. Other measuring devices may be used if desired, such for example as that of my application No. 359,981, filed May 2, 1929.

If the chemical or reagent container is located within the tank, 10, the construction shown in Fig. 2 will preferably be employed. This, of course, dispenses with the pipe, 23, and the mouth of the bottle or container, 220, has a ring-form cap, 30, secured to a vertical tube, 31, which extends into and out of the container and within which is vertically slidable the measuring rod, 270, of similar construction to the rod, 27, shown in Fig. 1, and like the latter having at its bottom a float, 290. By the ascent and descent of the rod, 270, its reduced portion, 280, moves from a point above the top of the guide, 31, to receive the liquid from the container, 220, to a point below the bottom thereof to discharge the measured quantity of liquid into the tank, 10.

What I claim is:—

1. Apparatus for mixing liquids, comprising, a mixing tank receiving liquid from a source of supply, means for delivering a measured quantity of a substance to said mixing tank for mixing with the liquid therein, a pressure service tank with a service outlet, an automatically controlled passage between the two tanks that causes intermittent flow from mixing to pressure tank, and means connecting the two tanks above the liquid levels therein to equalize pressure therein, said two tanks in operation having no other external connections with their interior.

2. Apparatus for mixing liquids, comprising, a mixing tank receiving liquid from a source of supply, means for delivering a measured quantity of a substance to said mixing tank for mixing with the liquid therein, a pressure service tank with a service outlet, a siphon-controlled passage between the two tanks that causes intermittent flow from mixing to pressure tank, and means connecting the two tanks above the liquid levels therein to equalize pressure therein, said two tanks in operation having no other external connections with their interior.

3. Apparatus as in claim 1 in which the passage between the two tanks is from the bottom portion of the mixing tank to the top portion of the pressure tank.

4. Apparatus for mixing liquids having two liquid holders, an outlet from one to the other, a measuring device that comprises a rod vertically movable across said outlet, means to guide the rod vertically, and a float connected with the rod that contacts with the liquid in the receiving tank and which by the liquid level determines the vertical position of said rod.

In testimony whereof I hereunto affix my signature.

HENRY L. WALTER.